(12) United States Patent
Symes et al.

(10) Patent No.: US 6,172,136 B1
(45) Date of Patent: Jan. 9, 2001

(54) PROCESS OF MAKING A DISPERSION OF STABILIZED PARTICLES

(75) Inventors: Kenneth Charles Symes; Kishor Kumar Mistry, both of West Yorkshire (GB); Ole Simonsen, Soborg; Mads Lykke, Bronshoj, both of (DK)

(73) Assignees: Ciba Specialty Chemicals Water Treatments Limited, West Yorkshire (GB); Novo Nordisk A/S, Bagsvaard (DK)

( * ) Notice: Under 35 U.S.C. 154(b), the term of this patent shall be extended for 0 days.

(21) Appl. No.: 09/107,121

(22) Filed: Jun. 30, 1998

(30) Foreign Application Priority Data

Jun. 30, 1997 (GB) .................................................. 9713810

(51) Int. Cl.$^7$ ........................................................ C11D 1/00
(52) U.S. Cl. ............................................ 523/201; 510/276
(58) Field of Search .............................................. 523/201

(56) References Cited

U.S. PATENT DOCUMENTS

| 3,429,827 | 2/1969 | Ruus . |
| 3,580,880 | 5/1971 | Clarke et al. . |
| 3,875,262 | 4/1975 | Milne . |
| 5,173,533 | 12/1992 | Yabuta et al. ......................... 524/523 |

FOREIGN PATENT DOCUMENTS

| 38 25 545 | 2/1989 | (DE) . | |
| 0 356 239 | 2/1990 | (EP) . | |
| 0 653 485 | 5/1995 | (EP) . | |
| 0 671 206 | 9/1995 | (EP) . | |
| 0707018 | 4/1996 | (EP) | ............................. C08F/287/00 |
| 1198052 | 7/1970 | (GB) | ............................... C08J/1/48 |
| 1231614 | 5/1971 | (GB) | ............................... C08F/43/00 |
| 18652/70 | 2/1972 | (GB) . | |
| 1268692 | 3/1972 | (GB) | ............................... C08F/3/68 |
| 2207681 | 2/1989 | (GB) | ............................... C08F/2/14 |
| WO 92/20771 | 11/1992 | (WO) . | |
| 94/25560 | 11/1994 | (WO) | ............................ C11D/11/00 |
| 95/07613 | 3/1995 | (WO) | ............................ A01N/25/04 |
| 97/241179 | 7/1997 | (WO) | ............................ B01J/13/16 |
| 97/24177 | 7/1997 | (WO) | ............................ B01J/13/16 |

*Primary Examiner*—Christopher Henderson
(74) *Attorney, Agent, or Firm*—Sughrue, Mion, Zinn, Macpeak & Seas, PLLC

(57) ABSTRACT

A dispersion in a liquid electrolyte (such as a detergent concentrate) of particles having a core containing an enzyme or other detergent active ingredient and a shell made by interfacial condensation is stabilised by covalently reacting a stabiliser on to reactive groups on the shell.

13 Claims, No Drawings

PROCESS OF MAKING A DISPERSION OF STABILIZED PARTICLES

BACKGROUND OF THE INVENTION

1. Field of the Invention

This invention relates to the formation of polymeric particles (ie particles having an external surface of organic polymer) which give improved stability when dispersed in a liquid detergent concentrate.

2. Description of the Related Art

Processes are described in PCT/GB96/03233 for forming particulate compositions comprising particles having a hydrophilic core within a shell comprising a membrane comprising an association product of (a) an interfacial condensation (IFC) product formed in a non-aqueous liquid by reaction between a first IFC reactant having at least two first condensation groups and the second IFC reactant having at least two second condensation groups and (b) an amphipathic polymeric stabiliser which will concentrate at the interface between oil and water and which has recurring hydrophobic groups and recurring reactive hydrophilic groups which associate with the second condensation groups. After formation in the non-aqueous liquid, the particles are then dispersed in liquid electrolyte.

It is explained in that application that the association may comprise a condensation reaction and, in particular, condensation may occur when the stabiliser is a copolymer of an ethylenically unsaturated carboxylic anhydride such as maleic anhydride and the second condensation groups are amino groups. It is also explained, however, that the association preferably comprises forming an internal, ring-formed salt between the adjacent carboxylic groups of a stabiliser formed from a monomer such as malcic acid or maleic anhydride with an IFC reactant which is a polyamine.

We have found that the best performance is generally achieved when the formation of the IFC shell does depend on 35 the use of a polycarboxylic stabiliser which is in hydrolysed acid form rather than anhydride form, and this is probably due to the fact that internal salt formation occurs and. that covalent reaction between the amine and the carboxylic acid groups does not occur during normal processing.

We have also found that when particles are made in this way, the resultant particles sometimes have less dispersion-stability than is desirable, especially when they are subsequently dispersed in an aqueous electrolyte solution (such as a liquid detergent concentrate) We have found that, when developing these unpublished processes, it is difficult simultaneously to optimise the shell formation and the stability of the particles in the final liquid dispersion. We believe that this may arise because of there being different requirements for optimum shell formation and for optimum stability. In particular, we believe that optimum shell formation may often be promoted by some degree of ionic association between the stabiliser and IFC reactant groups, but we believe that materials which are optimum for undergoing this ionic association may give less satisfactory stability in the final dispersion. Conversely, materials which may give optimum stability in the final dispersion appear to give less adequate shell formation.

Our object, arising out of this unpublished work, is to try to obtain a better combination of properties during manufacture and during long term storage in the electrolyte.

Different types of dispersions are known from, for instance, GB-A-1,198,052, GB-A-1,231,614, GB-A-1,268, 692, GB-A-2,207,681, AU-A-455,165, U.S. Pat. No. 3,580, 880, U.S. Pat. No. 3,875,262, EP-A-707,018 and EP-A-719, 085.

BRIEF SUMMARY OF THE INVENTION

According to the invention, we provide a process for making a dispersion in liquid electrolyte of particles having a size below 30 $\mu$m, the process comprising forming a dispersion in a first liquid of particles which have a size of below 30 $\mu$m and which have a core containing a detergent active ingredient and a shell which has been formed by interfacial condensation and which has an outer surface which includes reactive groups, and covalently reacting a reactive stabiliser material with some of the reactive groups and thereby forming a dispersion of the particles with the stabiliser material covalently bonded on to the outer surface of the shell of the particles, and dispersing the resultant self-stabilised particles into the liquid electrolyte.

DETAILED DESCRIPTION OF THE INVENTION

The dispersion is substantially stable and the particles may be self-stabilising, as explained below. The aqueous electrolyte is usually a concentrate which contains anionic or cationic surfactant as electrolyte, and the concentrate is usually a liquid detergent concentrate: It usually contains at least 0.5%, preferably at least 3%, most preferably at least 5% by weight electrolyte. It is usually an aqueous liquid electrolyte.

By saying that we covalently react the stabiliser material with some of the reactive groups, we mean that there is sufficient covalent bonding between the stabiliser material and the reactive groups to ensure that the stabiliser is attached to the particles by sufficient covalent bonding to hold the stabiliser material in place despite reasonable changes in the continuous phase in which the particles may be dispersed. For instance the stabiliser material should remain in place, and give a stabilising effect, even though the continuous phase may change from a first liquid which is non-aqueous, predominantly hydrocarbon, liquid to a relatively high electrolyte liquid, such as a detergent concentrate. There can additionally be some ionic bonding or other forms of association but there must be sufficient covalent bonding to dominate the performance of the particles when the continuous phase is changed.

The number of reactive groups which remain unreacted after covalently reacting the stabiliser material on to the particles is often unimportant but in practice there will always be some reactive groups that do not react covalently with the stabiliser. For instance some of the reactive groups will be prevented from reacting because of steric hindrance between the stabilizer and the particle surface. Some of the reactive groups will be prevented from reacting covalently because they may react in another manner, for instance forming an ionic complex. In practice some of the reactive groups may remain unreacted because there is a stoichiometric excess of reactive groups on the polymer particles over groups on the stabiliser that can react with them.

The invention is preferably applied to the production of particles which have a size at least 90% by weight below 30 $\mu$m, preferably below 10 or 20 $\mu$m and which are preferably to be provided as a substantially stable dispersion in a liquid detergent concentrate. The invention reduces or eliminates the risk of the particles sedimenting and/or aggregating, both at low concentrations (.e.g, down to 0.1% by weight) and at higher concentrations (e.g., 5% or even much higher such as 30% or 50% in some liquids used for introducing the particles into the detergent concentrate).

Thus, by the invention, a substantially stable dispersion of the particles may be formed in a first liquid (usually a non-aqueous liquid) and then these particles may be dispersed into the liquid detergent concentrate or other electrolyte, and the dispersion would have been less stable in this if the covalent bonding of the invention had not been applied. In particular, by the invention the dispersion in the liquid detergent concentrate is preferably more stable than if the same stabiliser material is simply mixed into the final dispersion of particles in the second liquid, without the covalent reaction. Generally the covalent reaction is conducted in the first (usually non-aqueous) liquid and the resultant self-stabilised particles are dispersed in the second liquid. However if desired the first non-aqueous liquid may be exchanged with another non-aqueous liquid or some other liquid such as a surfactant before the covalent reaction or even before adding the reactive stabiliser.

The change of the continuous phase from the first liquid to another liquid, and in particular to the detergent or other electrolyte concentrate can be conducted in various ways, for instance as described in PCT/GB96/03233.

The particles may be made by interfacial condensation (IFC) in a first liquid, as described in PCT/GB96/03233 and which is incorporated herein by reference.

The reactive groups on the polymer particles can be epoxide or hydroxyl groups (in which even the covalent bond will be an ether). They can be carboxylic groups (free acid, water soluble salt, anhydride or acid halide) in which event the covalent linkage can be an ester or amide linkage. Preferably, however, the reactive groups are amino groups in which event the covalent linkage is preferably an amide linkage, formed by reaction between these amino groups and carboxylic groups which can be covalently bonded with them.

Although covalent bonding can be achieved between carboxylic free acid, salt or halide. groups and amino groups, the covalent reaction generally occurs much more easily if the carboxylic groups are in the form of anhydride groups and thus preferably the reactive groups are amino groups and the stabiliser provides dicarboxylic anhydride groups.

We believe that one reason why some existing stabiliser systems are less effective in, for instance, detergent concentrates is that the reactive groups on many of the particles that are under consideration are ionisable (for instance being cationic or anionic) and the stabilizer is counterionic so that the attraction between the stabiliser and the particle is primarily ionic. This ionic attraction can be displaced by, for instance, changes in the electrolyte concentration.

In the invention, it is preferred that the reactive groups on the polymer particles are ionisable and the stabiliser is a counterionic material or a derivative (such as an anhydride) of a counterionic material and which is now covalently bonded to the particles in contrast to being ionically attached, as in prior processes.

The stabiliser material can be a monomeric material which achieves the self-stabilisinq effect merely by covalently blocking sufficient of the ionisable reactive qroups on the polymer particles that the stabilising effect is not significantly altered by moderate changes in electrolyte concentrate. For instance, amino reactive groups on the particles would normally be ionisable, but if they are reacted with a monomeric anhydride or acid halide they are covalently blocked and so cannot ionise. This prevention of ionization is, in some environments, sufficient to maintain self-stabilising properties when the continuous phase is changed.

Accordingly the invention includes processes in which the stabilising material is a monomeric anhydride or acid halide such as acetic anhydride, acetyl chloride, maleic anhydride or succinic anhydride and which is covalently reacted on to polymer particles having free amino groups so as to form amide groups. When these particles carrying amide groups are dispersed into a detergent liquid concentrate, optionally in the presence of additional polymeric stabiliser which is unreactive with the particles, the particles are self stabilising. The concentrate is normally an aqueous concentrate.

By this we mean that improved stability is obtainable compared to the stability that is achieved when the same particles are dispersed into the same liquid (in the presence of the same extra stabilizer if that is used) but without the prior reaction with the anhydride or acid halide. Preferably, however, the stabilising material which is used in the invention is a reactive copolymer of hydrophilic monomer units and hydrophobic monomer units, i.e., it is an amphipathic polymer. The hydrophilic units are attracted to the hydrophilic shell of the polymer particles and the hydrophobic units are attracted to the non-aqueous liquid- Suitable hydrophobic monomers and hydrophilic monomers and their amounts (except for the groups which are to react) are given in PCT/GB96/03233. The hydrophilic monomer units should provide groups which will react covalently with the reactive groups on the particles. Preferably the stabiliser is a copolymer of dicarboxylic anhydride monomer units and the reactive groups on the particles are amino groups.

The preferred aspects of the invention are those in which the dispersion in the first liquid is formed by IFC polymerisation in the presence of a first stabiliser which is a copolymer of hydrophobic units with hydrophilic units which preferably include dicarboxylic units and wherein the dicarboxylic units (if present) are in the hydrolysed form (free acid, acid salt or acid halide) and a second stabiliser is reacted with amino groups from the IFC polymerisation and the second stabiliser is a copolymer of hydrophobic monomer units with hydrophilic monomer units which include dicarboxylic acid units and wherein the dicarboxylic units include anhydride groups, whereby they will enter into covalent amide formation with the amino groups. Other stabilisers which have hydrophilic monomer units which can react covalently with the amino groups may be used.

In PCT/GB96/03233 we described a process in which IFC particles containing amine groups are made in the presence of one such stabiliser, either free dicarboxylic acid or anhydride, and preferably the invention does not include such an IFC process using, as the sole stabiliser, such a polymer which is hydrolysed (so that all the dicarboxylic acid groups are free acid or salt form) or mainly unhydrolysed anhydride, mainly meaning preferably above 80%.

We can obtain useful results using a polymer which is partially hydrolysed eg 20–80% anhydride and 80–20% dicarboxylic acid or acid salt, preferably 30–80% dicarboxylic acid.

We have now found that best results are achieved by using a combination of stabilisers (generally amphipathic stabilisers) wherein the first will predominantly enter into ionic association with the amino IFC reactant (so as to promote shell formation) and the other will enter into covalent reaction with the amino groups, so as to bond stabiliser to the surface of the particles and so as to block some or all of the ionisable amino groups. The first may have free dicarboxylic acid groups without anhydride, and the second may have anhydride groups.

Good results are also obtained when the amount of anhydride monomer units is low, e.g., 1 to 10% by weight of the monomers or when 1 to 10% glycidyl monomer units are included instead of the anhydride units.

The remaining hydrophilic units in the stabiliser can be mono- or di- carboxylic acid monomer units and/or hydroxyalkyl monomer units, generally to provide 10 to 30 mole % ionic or other hydrophilic units, with the balance being hydrophobic (see PCT/GB96/03233). Suitable hydrophobic groups include fatty (C9–24) alkyl (meth) acrylates, C1–4 alkyl (meth) acrylates and styrenes.

The second carboxylic stabiliser, or other stabilising material which is to react with the reactive groups, may be added at any time such that it achieves the desired effect and blocks the ionisable groups in the final particles. For instance the particles may be formed initially with the reactive groups on them (optionally in the presence of a polymeric stabilizer) and then the stabilising material may be reacted covalently on to the particles having the reactive groups. Thus the particles may be formed in the presence of one stabiliser (which is unreactive) and then the reactive stabiliser is added and reacted on to the particles. As another example, the stabiliser which is to react with the reactive groups may be added before the formation of the particles is completed.

The stabiliser which is to be covalently reacted on to the reactive groups may be incorporated before the interfacial condensation reaction is started. For instance both a dicarboxylic acid stabiliser and a dicarboxylic anhydride stabiliser may be present before the IFC is initiated. For instance the slabiliser which is to promote wall formation (e.g., the dicarboxylic acid stabiliser) may be present during the emulsification of the aqueous core phase into a non-aqueous liquid, and the stabiliser which is to react covalently with amino or other reactive groups is then added, for instance with the other IFC reactant.

Irrespective of when the various materials are added, the process of the invention preferably includes a reaction stage at the end of the particle formation (or subsequently) in order to allow the reaction which forms the covalent linkages. For instance the dispersion may be left to react at ambient temperature for, for instance 3 to 48 hours, but preferably the reaction is driven by heating, e.g., to 30 to 90° C., preferably 35° C. to 60° C. or 70° C., for 1 to 18 hours, e.g., 3 to 16 hours at 35–550° C.

The active ingredients which may be present in the core of the shell core particles, can be any active ingredient which is useful in detergent concentrates, as described in PCT/GB96/03233. The core is usually hydrophilic. Preferably the active ingredient is an enzyme such as one or more proteases, lipases, eutinases, amylases, cellulases, peroxidases or oxidases (e.g. laccases).

The core is hydrophilic, and often includes water.

The detergent concentrates may be as described in PCT/GB96/03233 and PCT/GB96/03231 (WO97/24177 and WO97/24179) which are incorporated herein by reference. The detergent concentrate may comprise one or more surfactants, e.g. anionic, nonionic, cationic, ampholytic, zwitterionic, or semi-polar surfactants, and may be aqueous or substantially non-aqueous. Other ingredients normal for detergent concentrates or compositions may also be included, e.g. builder systems, suds suppressors, soil-suspending agents, soil-releasing agents, bleaching agents, optical brighteners, abrasives, bacterides, tarnish inhibitors, coloring agents and/or perfumes.

It is preferable to encapsulate active ingredients such as proteolytic enzyme e.g. Savinase by using the process of this invention. The protease enzyme will remain within the interior of the IFC microcapsules in concentrated liquid detergent and only be released after dilution of the detergent formulation into wash water.

This allows other enzyme types (for instance lipases, amylases, cellulases) to be incorporated into liquid detergents containing the degrading proteolytic enzymes.

The following are examples of the invention.

EXAMPLE 1

This example shows that the Savinase microcapsules obtained in Example 1 of PCT/GB96/03233 when using hydrolysed maleic acid copolymer stabiliser ran be poet treated to improve the capsules from aggregating in liquid detergent formulations.

Acetic anhydride (2.5 parts) was added to 50 parts of Savinase microcapsules dispersion in surfactant (Capsules A) under stirring. The mixture formed was allowed to react for 1 hour at room temperature (20° C.) to give Capsules B.

Capsules B showed no loss of enzyme activity nor alteration of performance properties.

The enzyme capsules A and B were separately dosed into commercial heavy duty liquid detergents at 0.10 KNPU/g protease activity. Each one of the detergent mixtures was placed in an oven at 40° C. and subjected to the accelerated storage test.

After 24 hours, the detergent mixture containing Capsules A had aggregated and settled to the bottom of the container. The acetic anhydride treated microcapsules (Capsule B) remained dispersed and showed no signs of instability. After, further 3 days at 40° C., Capsules B showed formation of fine aggregates.

EXAMPLE 2

Savinase enzyme microcapsules were prepared according to Example 1 of PCT/GB96/03233 except that an oil-soluble stabiliser having a proportion (about 25t) of unhydrolysed (maleic anhydride) groups in the stabilising polymer was employed instead of the fully hydrolysed version.

The resulting capsules (Capsules C) were dosed in liquid detergent at 0.10 KNPU/g enzyme activity and placed in an oven at 40° C. Also, a comparative detergent mixture was made with Capsules A (Example 1 of PCT/GB96/03233). Capsules A aggregated and settled to the bottom of the container after 1 day storage. Capsules C remain dispersed and showed no signs of instability after 1, 4 and 7 days storage.

EXAMPLE 3

A dispersion of microcapsules was prepared as in Example 1 of PCT/GB96/03233 using a polymeric stabiliser in which the hydrophilic groups are hydrolysed to maleic acid groups. The dispersion was then treated as in that Example first to dehydrate the dispersion to provide anhydrous particles in hydrocarbon, then to exchange the hydrocarbon with a non-ionic surfactant to provide an anhydrous dispersion in non-ionic surfactant, and then to mix this dispersion into a heavy duty liquid detergent at 0.10 KNPU/g enzyme activity.

When an addition of the same polymeric stabiliser, but in the unhydrolysed, anhydride form, was made to the wet or dry dispersion in hydrocarbon or the dispersion in nonaqueous liquid, it was found that storage stability was improved compared to the process without the addition of this extra, anhydride, stabiliser.

EXAMPLE 4

Protection of Lipase Enzyme from degrading Protease Enzyme

This example demonstrates that non-protective enzymes such as Lipolase, a lipase enzyme can be protected from proteases such as Savinase enzyme by use of product formed in Example 2 (Capsules C).

To three separate concentrated liquid detergent samples containing liquid Lipolase enzyme at 1.0 KLU/g enzyme activity One of the following Savinase formulations is added at 0.10 KNPU/g protease enzyme activity.

(a) Liquid Savinase enzyme (16.OL)
(b) Savinase Capsules A (Example 1 of PCT/GB96/03233)
(c) Savinase Capsules C (Example 2 of present patent)

Each of the detergent samples is subjected to an accelerated test at 3° C. After the storage test each detergent mixture is analysed for lipase enzyme activity.

The percentage of Lipolase enzyme activity remaining after 1, 2, 4 weeks in detergent samples is given in Table 1.

TABLE 1

| Savinase Formulation | % Lipolase After 1 Week | % Lipolase After 2 Weeks | % Lipolase After 4 Weeks |
| --- | --- | --- | --- |
| Liquid Savinase | 8 | 0 | 0 |
| Capsules A | 94 | 81 | 56 |
| Capsules C | 94 | 82 | 57 |

The above results clearly demonstrates that the Capsules C of this invention gives the same performance as Capsules A and protects the lipase enzyme from the degrading Savinase enzyme compared to the un-encapsulated liquid formulation.

EXAMPLE 5

Sample A

A capsule dispersion in Isopar was prepared according to example 6B in PCT/GB96/03233 where the polymer was replaced with a sodium polyacrylate homopolymer of similar molecular weight, the stabiliser was replaced by a copolymer of styrene, stearyl methacrylate and maleic acid. For analysis 0.44g capsules A was mixed with 50.0 g Detergent 1 and left stirring for one hour.

Sample B 16.3 g Triethanolamine (TEA) was emulsified into 500.0 g capsules A using a high shear Silverson mixer (trade name) for 5 minutes. The capsules were-left stirring 3 hours at 40° C. 178.2 g hereof was mixed with 20.2 g of a 20% solution in hydrocarbon of a copolymer of 65t stearyl methacrylate, 17.5 styrene, 15% maleic acid and 2.5% maleic anhydride (by weight), under stirring. The capsules were left stirring overnight at 40° C. For analysis 0.47 g capsules B was mixed with 50.0 g Detergent 1 and left stirring for one hour.

Sample C 3.1 g capsules B were mixed with 31 g non-ionic surfactant (Softanol 50). The capsules were left stirring at 40° C. for one hour. For analysis 0.94 g capsules C was mixed with 50.0 g Detergent 1 and left stirring for one hour.

Detergent 1 in A–C is a commercially available US liquid detergent (WISK Free Clear).

The detergents with capsules were placed at 40° C. and inspected visually as a function of time, the results are given in the following table.

|  | Sample A | Sample B | Sample C |
| --- | --- | --- | --- |
| 0 days | No aggregates | No aggregates | No aggregates |
| 1 day | Small aggregates | No aggregates | No aggregates |
| 2 days | Large aggregates | Small aggregates | No aggregates |
| 3 days | Large aggregates | Small aggregates | No aggregates |
| 6 days | Large aggregates | Small aggregates | Small aggregates |
| 13 days | Large aggregates | Large aggregates | Small aggregates |

The above results demonstrates that reaction with the reactive polymeric stabiliser improves the physical stability of the capsules, and even better results can be obtained by adding a non-ionic surfactant.

EXAMPLE 6

1050.0 g capsules A from example 5 was mixed with 30.3 g Triethanolamine using a high shear Silverson mixer for 10 minutes. The capsules were left stirring overnight at 40° C. Concentrates capsules were produced by centrifugation of 108 g of the capsules, removing 55 g of the oil phase, leaving 53 g concentrated capsules.

Sample D 53.0 g concentrated capsules were mixed with 8.1 g of a 20% solution in hydrocarbon of a copolymer of 55% stearyl methacrylate, 33% methyl methacrylate, 10% methacrylic acid and 2% glycidyl methacrylate and 8.3 g Isopar and left stirring overnight at 40° C. 31.9 g non-ionic surfactant (Softanol 50) was added and stirred overnight at 40° C. For analysis 0.45 g capsules D was mixed with 50.0 g Detergent 2 and left stirring for 1 hour, Sample E 53.0 g concentrated capsules were mixed with 16.8 g of the same dissolved reactive polymeric stabiliser as in Sample D and left stirring overnight at 40° C. 35.6 g non-ionic surfactant (Softanol 50) was added and stirred overnight at 40° C. For analysis 0.45 g capsules E was mixed with 50.0 g Detergent 2 and left stirring for 1 hour.

Detergent 2 in D–E is a commercially available US liquid detergent (Ultra Tide Free).

The detergents with capsules were placed at 40° C. and inspected visually as a function of time, the results are given in the following table.

|  | Sample D | Sample E |
| --- | --- | --- |
| 0 days | No aggregates | No aggregates |
| 1 day | No aggregates | No aggregates |
| 5 days | Large aggregates | No aggregates |
| 12 days | Large aggregates | No aggregates | the above results demonstrates that increasing the amount of reactive polymeric stabilizer further improves the physical stability of the capsules.

What is claimed is:

1. A process for making a dispersion in a liquid electrolyte of dispersed particles having a size below 30 $\mu$m, the process comprising forming a dispersion in a first liquid of particles which have a size of below 30 $\mu$m and which have a core containing a detergent active ingredient and a shell which has been formed by interfacial condensation and which has an outer surface which includes reactive groups, and covalently reacting a reactive stabilizer material with reactive groups on the outer surface of the particles and thereby forming a dispersion of the particles with the stabilizer material covalently bonded on to the outer surface of the shell of the particles, and dispersing the resultant self-stabilized particles into the electrolyte.

2. A process according claim 1 in which the first liquid is a non-aqueous liquid and the liquid electrolyte is aqueous.

3. A process according to claim 1 in which the active ingredient is an enzyme.

4. A process according to claim 1 in which the aqueous electrolyte is a detergent concentrate.

5. A process according to claim 1 in which the reactive groups are epoxide or hydroxyl and the covalent linkage is an ether, or the reactive groups are amino groups and the covalent linkage is an amide, or the reactive groups are carboxylic free acid or anhydride or acid halide or salt and the covalent linkage is an ester or amide.

6. A process according to claim 5 in which the reactive groups are amino groups and the covalent linkages are amide groups.

7. A process according to claim 1 in which the reactive groups are ionizable and the reactive stabilizer reacts covalently with the ionizable groups to block the ionizable groups.

8. A process according to claim 1 in which the reactive stabilizer material is a material which, when covalently bonded to the particles, provides improved stabilization in the concentrate compared to the stabilization which is achieved using the same stabilizer absorbed or ionically associated with the particles in the same concentrate.

9. A process according to claim 1 in which the reactive stabilizer material is a copolymer of hydrophilic monomer units and hydrophobic monomer units.

10. A process according to claim 9 in which the shell of the particles has been made by interfacial condensation in the presence of a first polymeric stabilizer which is a copolymer of hydrophobic monomer units with hydrophilic monomer units and wherein the shell has free reactive amino groups, and the reactive stabilizer material is a copolymer of hydrophobic monomer units with hydrophilic monomer units which include units which can react covalently with the amino groups.

11. A process according to claim 1 in which the reactive stabilizer material is a copolymer of (a) hydrophilic monomer units comprising dicarboxylic anhydride, monomer units and (b) hydrophobic monomer units.

12. A process according to claim 1 in which the reactive stabilizer material which is to be covalently reacted with the reactive groups is added after the shell formation is completed.

13. A process according to claim 1 in which the shell formation is completed in a non-aqueous, first, liquid and the reactive stabilizer material is reacted with the reactive groups of the shell while the particles are dispersed in a non-aqueous liquid.

* * * * *